US009537411B2

(12) United States Patent
Lin et al.

(10) Patent No.: US 9,537,411 B2
(45) Date of Patent: Jan. 3, 2017

(54) FLYBACK ACTIVE CLAMPING POWER CONVERTER

(71) Applicant: LITE-ON TECHNOLOGY CORPORATION, Taipei (TW)

(72) Inventors: Chien-Yu Lin, Taipei (TW); Wei-Lieh Lai, New Taipei (TW); Yu-Kang Lo, Taipei (TW); Huang-Jen Chiu, New Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 135 days.

(21) Appl. No.: 14/621,439

(22) Filed: Feb. 13, 2015

(65) Prior Publication Data
US 2015/0303818 A1    Oct. 22, 2015

(30) Foreign Application Priority Data
Apr. 18, 2014    (TW) ............................. 103114193 A

(51) Int. Cl.
*H02M 3/335*    (2006.01)
*H02M 1/00*    (2006.01)

(52) U.S. Cl.
CPC . *H02M 3/33569* (2013.01); *H02M 2001/0058* (2013.01); *Y02B 70/1433* (2013.01); *Y02B 70/1491* (2013.01)

(58) Field of Classification Search
CPC ................ H02M 2001/0058; H02M 1/083; H02M 3/33569; Y02B 70/1491; Y02B 70/1433

See application file for complete search history.

(56) References Cited

U.S. PATENT DOCUMENTS

| 5,157,593 | A | * | 10/1992 | Jain | ....................... | H02M 3/337 363/132 |
| 5,748,457 | A | * | 5/1998 | Poon | ..................... | H02M 3/158 363/131 |
| 6,069,803 | A | | 5/2000 | Cross | | |
| 9,178,438 | B2 | * | 11/2015 | Fu | ...................... | H02M 3/33576 |
| 9,356,527 | B2 | * | 5/2016 | Lin | ................... | H02M 3/33569 |
| 2006/0002158 | A1 | | 1/2006 | Odell | | |

(Continued)

FOREIGN PATENT DOCUMENTS

TW              521481         2/2003
TW          200742237 A       11/2007
(Continued)

*Primary Examiner* — Jessica Han
(74) *Attorney, Agent, or Firm* — Li & Cai Intellectual Property (USA) Office

(57) ABSTRACT

A flyback active clamping power converter is disclosed. The flyback active clamping power converter comprises an input inductor, a down-bridge switch, an up-bridge switch, a first energy-storing capacitor, a clamping capacitor, a resonant inductor, a magnetizing inductor, a transformer, an output diode and an output capacitor. When a resonant frequency generated by the resonant inductor and the clamping capacitor in the flyback active clamping power converter is substantially equal to a switching frequency, the output diode is able to perform a zero current switching in the whole load range.

8 Claims, 1 Drawing Sheet

(56) References Cited

U.S. PATENT DOCUMENTS

| | | | | |
|---|---|---|---|---|
| 2010/0067259 A1* | 3/2010 | Liu | ............... | H02M 3/33569 363/21.01 |
| 2011/0255321 A1* | 10/2011 | Figge | ............... | H02M 3/3382 363/132 |
| 2014/0226367 A1* | 8/2014 | Hu | ............... | H02M 3/33569 363/21.04 |

FOREIGN PATENT DOCUMENTS

| TW | I357704 B | 2/2012 |
|---|---|---|
| TW | I414135 B | 11/2013 |

\* cited by examiner

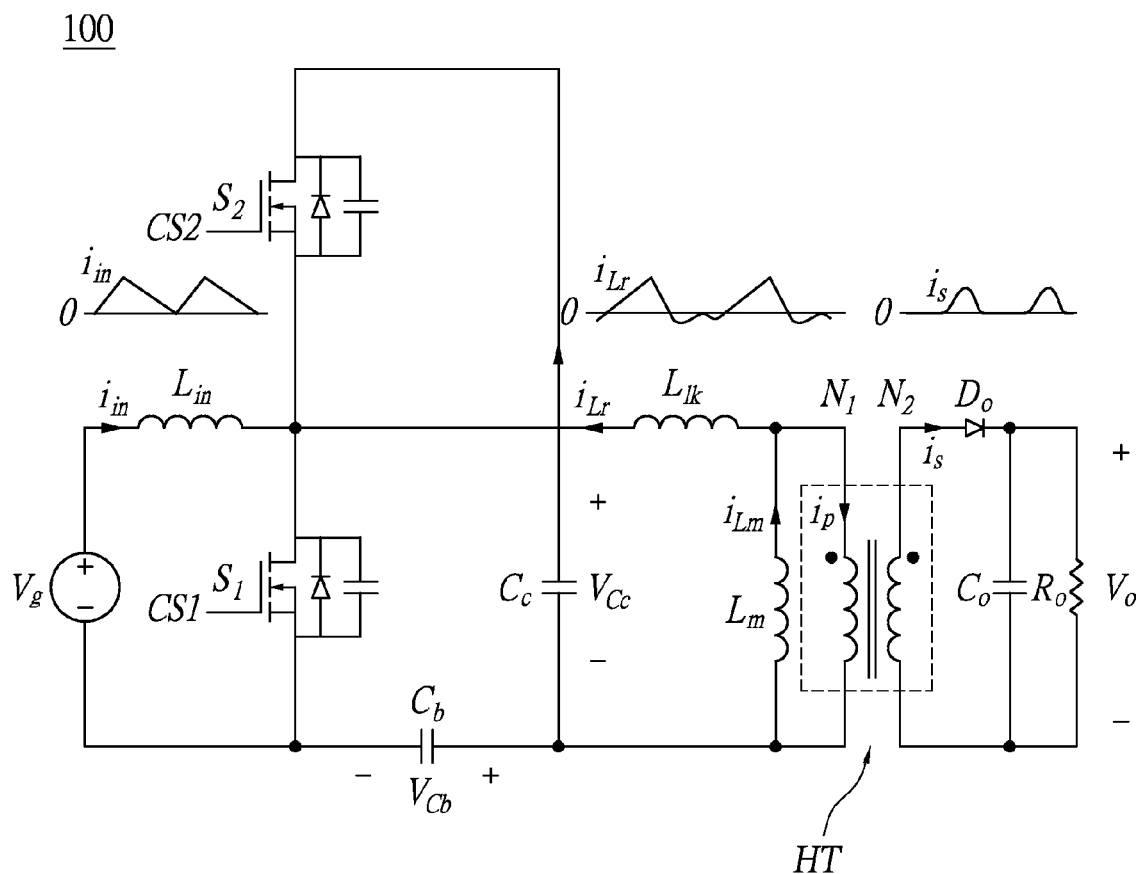

FLYBACK ACTIVE CLAMPING POWER CONVERTER

BACKGROUND

1. Technical Field

The present disclosure is related to a power converter, and in particular, to a flyback active clamping power converter making a diode in a secondary side perform Zero Current Switching (ZCS), preferably a single-ended primary inductance converter.

2. Description of Related Art

With the advancement of technology and the rapid development of portable electronic products, more and more attention has been paid to the performance of switching converters and each of their applications. In recent years, due to major advances in the power electronics technology and the development of nanotechnology, a growing tendency of electronic devices has been towards being slim and light, energy saving, and cost-reducing, so its internal power converter design also needs to trend to be slim and light, energy saving, power increasing, and cost-reducing. A power supply is generally required for most of electric appliances, to convert an input power source from batteries or AC power grids into an output power source with specific ratings. As technology advances, it has become routine for power supplies to operate more efficiently or have higher conversion efficiency. As known in the art, the conversion efficiency of a power supply is defined as the ratio of the output power from the output power source to the input power from the input power source.

A power conversion system receives an input DC or AC power and converts the input DC or AC power to a DC or AC output power, and the DC or AC output power usually presents a voltage different from the input power. Control of the output power may respond to the output voltage or the output current. A boost converter (also known as step-up converter) is a power converter in which the output voltage is greater than the input voltage. The boost converter includes at least a first electrically controlled switch (for example, a transistor), at least a first energy-storing element (for example, an electric coil) and a switched mode power for an add-on (for example, a diode or a second electrically controlled switch). Generally, the electrically controlled switches and the diodes are configured between the coil and the output end, wherein the current alternately charges the coil, in response to a turning-off operation of the first electrically controlled switch, and the current is transmitted to a load, in response to a turning-on operation of the first electrically controlled switch. When the current is transmitted to the load, the current is flowing through the diode or the second electrically controlled switch. A buck converter (also known as a step-down converter) is a power converter in which the input voltage is greater than the output voltage. The buck converter includes at least a third electrically controlled switch (for example, a transistor), at least a second energy-storing element (for example, an electric coil) and a switched mode power source for an add-on (for example, a diode or a fourth electrically controlled switch). Generally, the electrically controlled switches and the diodes are configured between the input power source and the coil, wherein the current alternately draws and charges the electric coil via a load, in response to a turning-off operation of the third electrically controlled switch, and the electric coil continuously releases energy to the load, in response to a turning-on operation of the third electrically controlled switch. When the coil releases energy to the load, the diode or the fourth electrically controlled switch is connected to the coil in series. A flyback converter is a power converter in which the output voltage can be greater or less than the input voltage. The flyback converter is a switched mode power which includes at least an electrically controlled switch; an energy-storing element which includes at least a coil (especially a transformer), whereby a voltage ratio is increased with an additional advantage of isolation; and at least an add-on (for example, a diode and/or an additional electrically controlled switch). Generally, a primary coil of the transformer is connected between the electrically controlled switch and the input voltage, and a secondary coil of the transformer is connected between the add-on and the output voltage. As used herein, the above-mentioned power converters are used for explanation of some topologies, but are not limited thereto.

In the low-power applications, the flyback converter is a widely used power circuit, but the flyback converter has the disadvantages of input current pulse suffering from electromagnetic interference (EMI) and voltage spikes caused by leakage inductance. Therefore, in the prior art, the single-ended primary inductor converter has been used to reduce the disadvantage of electromagnetic interference. However, the traditional active clamping single-ended primary inductor converter (SEPIC) has a higher spike voltage in the diode in the secondary side, thus the efficiency cannot be greatly improved.

SUMMARY

In view of the foregoing background, it is therefore an object of the present invention to provide a flyback active clamping power converter that achieves an output diode able to perform a zero current switching in the whole load range so as to reduce switching losses of power conversion.

An embodiment of the instant disclosure provides a flyback active clamping power converter. The flyback active clamping power converter includes an input inductor, a down-bridge switch, an up-bridge switch, a first energy-storing capacitor, a clamping capacitor, a resonant inductor, a magnetizing inductor, a transformer, an output diode and an output capacitor. A first end of the input inductor is connected to a positive terminal of an input voltage source, wherein an input inductor current flowing through the input inductor operates in a boundary conduction mode. A control end of the down-bridge switch receives a first control signal, and a first end of the down-bridge switch is connected to a negative terminal of the input voltage source, wherein the down-bridge switch is determined to be turned on or turned off according to a level of the first control signal. A control end of the up-bridge switch receives a second control signal, and a first end of the up-bridge switch is connected to a second end of the down-bridge switch, wherein the up-bridge switch is determined to be turned on or turned off according to a level of the second control signal, and the down-bridge switch and the up-bridge switch have a switching frequency. A first end of the first energy-storing capacitor is connected to the first end of the down-bridge switch. A first end of the clamping capacitor is connected to the second end of the up-bridge switch, and a second end of the clamping capacitor is connected to a second end of the first energy-storing capacitor. A first end of the resonant inductor is connected to a second end of the down-bridge switch. A first end of the magnetizing inductor is connected to the resonant inductor, and a second end of the magnetizing inductor is connected to the second end of the clamping capacitor, wherein a current flowing through the magnetizing inductor is a magnetizing inductor current. The transformer has a primary winding and a secondary winding, and the primary winding is connected with the magnetizing inductor in parallel, wherein there is a mutual inductance effect between the primary winding and the secondary winding. An anode of the output diode is connected to a first end of the secondary winding. A first end of the output capacitor is connected to a cathode of the output diode, and a second end of the output capacitor is connected to a second end of the secondary winding. A resonant frequency generated by the resonant inductor and the clamping capacitor in the flyback active clamping power converter is substantially equal to the switching frequency, such that the output diode is able to perform a zero current switching.

In an embodiment of the instant disclosure, when the resonant frequency generated by the resonant inductor and the clamping capacitor is equal to the switching frequency, a current value of a primary current flowing through the primary winding is gradually reduced to zero, such that a current value of a secondary current flowing through the secondary winding is zero, such that the output diode is able to perform the zero current switching.

In an embodiment of the instant disclosure, when a current value of the magnetizing inductor current is substantially equal to a current value of a resonant current, the current value of the primary current is substantially equal to zero current value, wherein the resonant current is a current flowing through the resonant inductor.

In an embodiment of the instant disclosure, when the down-bridge switch is turned on, the input inductor current charges the input inductor.

In an embodiment of the instant disclosure, when the up-bridge switch is turned off and a current value of the input inductor current is zero, the magnetizing inductor current charges a parasitic capacitor of the down-bridge switch.

In an embodiment of the instant disclosure, when the voltage across the first and second end of the down-bridge switch is zero, the magnetizing inductor current flows through a body diode of the down-bridge switch, such that the voltage of the first energy-storing capacitor increases linearly with the increase of the magnetizing inductor current.

In an embodiment of the instant disclosure, when the down-bridge switch is turned off, the input inductor current and the magnetizing inductor current charge a parasitic capacitor of the down-bridge switch.

In an embodiment of the instant disclosure, when a body diode of the up-bridge switch is turned on, a conduction current charges the clamping capacitor, wherein the conduction current is the sum of the input inductor current and the magnetizing inductor current.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 1 is a schematic circuit diagram of a flyback active clamping power converter according to an exemplary embodiment of the instant disclosure.

DESCRIPTION OF THE EXEMPLARY EMBODIMENTS

Example embodiments will be described below in more detail with reference to the accompanying drawings. Many different forms and embodiments are possible without deviating from the spirit and teachings of this disclosure and so the disclosure should not be construed as limited to the embodiments set forth herein. Rather, these embodiments are provided so that this disclosure will be thorough and complete, and will fully convey the scope of the disclosure to those skilled in the art. In the drawings, the sizes and relative sizes of layers and regions may be exaggerated for clarity. Like reference numbers refer to like elements throughout.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below and hence, a first element, component, region, layer or section may be termed as a second element, component, region, layer or section without departing from the teachings of the present disclosure. As used herein, the term "and/or" includes any and all combinations of one or more of the associated listed items.

The following instruction is to describe a flyback active clamping power converter via a plurality of embodiments with corresponding drawings. However, the embodiments below are not for restricting the scope of the instant disclosure.

Embodiment of a Flyback Active Clamping Power Converter

Because the traditional active clamping single-ended primary inductor converter has a higher spike voltage in the diode in the secondary side, the efficiency cannot be greatly improved. The instant disclosure provides a flyback active clamping power converter which makes the diode in the secondary side be able to perform a zero current switching and thus to enhance the efficiency so as to reduce a flexible switching loss of power converting and to solve the reverse-recovery current issue of the diode in the secondary side. Thereby, the power efficiency of a mobile device (such as a notebook) may be increased and the volume of the circuit is dramatically reduced through an operation in high frequency.

Please refer to FIG. 1, which is a schematic circuit diagram of a flyback active clamping power converter according to an exemplary embodiment of the instant disclosure. As shown in FIG. 1, the flyback active clamping power converter 100 includes an input inductor Lin, a down-bridge switch S1, an up-bridge switch S2, a first energy-storing capacitor $C_b$, a clamping capacitor $C_c$, a resonant inductor $L_{lk}$, a magnetizing inductor $L_m$, a transformer HT, an output diode $D_o$ and an output capacitor $C_o$, wherein the flyback active clamping power converter 100 is connected to a load $R_o$ and outputs an output voltage $V_o$.

A first end of the input inductor $L_{in}$ is connected to a positive terminal of an input voltage source $V_g$, wherein an input inductor current flowing through the input inductor $L_{in}$ operates in a boundary conduction mode. A control end of the down-bridge switch S1 receives a first control signal CS1, and a first end of the down-bridge switch S1 is connected to a negative terminal of the input voltage source $V_g$, wherein the down-bridge switch S1 is determined to be turned on or off according to a level of the first control signal CS1. A control end of the up-bridge switch S2 receives a second control signal CS2, and a first end of the up-bridge switch S2 is connected to a second end of the down-bridge switch S1, wherein the up-bridge switch S2 is determined to be turned on or off according to a level of the second control signal CS2, and the down-bridge switch S1 and the up-bridge switch S2 have a switching frequency. A first end of the first energy-storing capacitor $C_b$ is connected to the first end of the down-bridge switch S1. A first end of the clamping capacitor $C_c$ is connected to a second end of the up-bridge switch S2, and a second end of the clamping capacitor $C_c$ is connected to a second end of the first energy-storing capacitor $C_b$. A first end of the resonant inductor $L_{lk}$ is connected to the second end of the down-bridge switch S1. A first end of the magnetizing inductor $L_m$ is connected to the resonant inductor $L_{lk}$, and a second end of the magnetizing inductor $L_m$ is connected to the second end of the clamping capacitor $C_c$, wherein the current flowing through the magnetizing inductor $L_m$ is a magnetizing inductor current $i_{Lm}$. The transformer HT has a primary winding and a secondary winding, and the primary winding is connected with the magnetizing inductor $L_m$ in parallel, wherein the primary winding and the secondary winding have a mutual inductance effect. An anode of the output diode $D_o$ is connected to a first end of the secondary winding. A first end of the output capacitor $C_o$ is connected to a cathode of the output diode $D_o$, and a second end of the output capacitor $C_o$ is connected to a second end of the secondary winding. In the present embodiment, a ratio between the primary winding and the secondary winding is N1:N2, wherein N1 and N2 are respectively positive integers greater than one.

To describe an operation process of the flyback active clamping power converter 100 of the instant disclosure in detail, there is at least one of the embodiments in the following paragraphs for further explanantion.

The instant disclosure discloses controlling a resonant frequency generated by the clamping capacitor $C_c$ and the resonant inductor $L_{lk}$ in the flyback active clamping power converter 100 to be substantially equal to the switching frequency to make the output diode $D_o$ perform zero current switching. To be more exact, when the resonant frequency generated by the clamping capacitor $C_c$ and the resonant inductor $L_{lk}$ in the flyback active clamping power converter 100 is equal to the switching frequency, a current value of a primary current $i_p$ flowing through the primary winding is gradually reduced to zero, such that a current value of a secondary current $i_s$ flowing through the secondary winding is zero, thus the output diode $D_o$ is able to perform the zero current switching. It is worth mentioning that when the current value of the magnetizing inductor current $i_{Lm}$ is substantially equal to the current value of the resonant current $i_{Lr}$, the current value of the primary current $i_p$ is substantially equal to a zero current value. Therefore, the mutual inductance effect between the primary winding and the secondary winding causes the current value of the secondary current $i_s$ to be zero, wherein the resonant current $i_{Lr}$ is a current flowing through the resonant inductor $L_{lk}$.

In addition, during the period when the input voltage source $V_g$ is at the zero voltage level, when the up-bridge switch S2 in the flyback active clamping power converter 100 is turned off and the input inductor current $i_{in}$ is zero, the magnetizing inductor current $i_{Lm}$ charges a parasitic capacitor of the down-bridge switch S1. Next, still during the period when the input voltage source $V_g$ is at the zero voltage level, when the voltage across the first end and second end of the down-bridge switch S1 in the flyback active clamping power converter 100 is zero, the magnetizing inductor current $i_{Lm}$ flows through a body diode of the down-bridge switch S1, such that the capacitor voltage $V_{Cb}$ of first energy-storing capacitor $C_b$ increases linearly with the increase of the magnetizing inductor current $i_{Lm}$. When the input voltage source $V_g$ is equal to a fixed voltage value (such as 120 volts), the down-bridge switch S1 starts turning on, so the input inductor current $i_{in}$ charges the input inductor $L_{in}$, and a first switch current flowing through the down-bridge switch S1 is the sum of the input inductor current $i_{in}$ and the magnetizing inductor current $i_{Lm}$. Afterwards, during the period when the input voltage source $V_g$ is at the zero voltage level, when the down-bridge switch S1 in the flyback active clamping power converter 100 is turned off, the input inductor current $i_{in}$ and the magnetizing inductor current $i_{Lm}$ charge the parasitic capacitor of the down-bridge switch S1.

Afterwards, still during the period when the input voltage source $V_g$ is at the zero voltage level, when a body diode of the up-bridge switch S2 in the flyback active clamping power converter 100 starts turning on, the conduction current charges the clamping capacitor $C_c$, wherein the conduction current is the input inductor current $i_{in}$ and the magnetizing inductor current $i_{Lm}$. Next, still during the period when the input voltage source $V_g$ is at the zero voltage level, when the up-bridge switch S2 in the flyback active clamping power converter 100 is turned on, the first switch current slowly drops to zero. Then, during the period when the input voltage source $V_g$ changes from the zero voltage level to a fixed voltage value (such as 120 volts), the capacitor voltage $V_{Cc}$ of the clamping capacitor $C_c$ may be large enough to make the output diode $D_o$ of the secondary side in the flyback active clamping power converter 100 be forward conductive. While an output voltage $V_o$ at the secondary side goes back to the primary side due to the induction of the transformer with the n-multiple factor (the winding ratio of the primary winding and the secondary winding is N1:N2). Finally, during the period when the input voltage source $V_g$ changes from the fixed voltage value (such as 120 volts) to the zero voltage level, the resonant inductor current $i_{Lr}$ is less than the magnetizing inductor current $i_{Lm}$, hence the output diode of the secondary side will be turned off by zero current switching.

It is worth mentioning that, for the efficiency of power conversion, the conversion efficiency of the traditional active clamping single-ended primary inductor converter is not good enough, about 88-89%. However, the flyback active clamping power converter 100 provided in the instant disclosure controls the resonant frequency generated by the resonant inductor $L_{lk}$ and the clamping capacitor $C_c$ to be substantially equal to the switching frequency, for reducing the energy loss of circuits and further improving the overall conversion efficiency, wherein the conversion efficiency is about 91.47%.

To sum up, the instant disclosure provides a flyback active clamping power converter, wherein when the resonant frequency generated by the resonant inductor and the clamping capacitor in the flyback active clamping power converter is substantially equal to the switching frequency, the output diode is able to perform zero current switching in the whole load range. Accordingly, the flyback active clamping power converter can reduce the switching loss of power conversion and there is no reverse-recovery current on the output diode, and thus there is no spike voltage on the output diode. In the choice of the application of output diodes element, diodes with a lower peak inverse voltage (PIV) can be selected, and an additional snubber is not needed.

The instant disclosure can be implemented in any suitable form including hardware, software, firmware or any combination of these. The invention may optionally be implemented partly as computer software running on one or more data processors and/or digital signal processors. The units and components of an embodiment of the invention may be physically, functionally and logically implemented in any suitable way. Indeed a certain functionality may be implemented in a single unit, in a plurality of units or as part of other functional units. As such, the invention may be implemented in a single unit or may be physically and functionally distributed between different units and processors.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A flyback active clamping power converter, comprising:
    an input inductor, a first end thereof is connected to a positive terminal of an input voltage source, wherein an input inductor current flowing through the input inductor operates in a boundary conduction mode;
    a down-bridge switch, a control end thereof receiving a first control signal, and a first end thereof is connected to a negative terminal of the input voltage source, wherein the down-bridge switch is determined to be turned on or off according to a level of the first control signal;
    an up-bridge switch, a control end thereof receiving a second control signal, and a first end thereof connected to a second end of the down-bridge switch, wherein the up-bridge switch is determined to be turned on or off according to a level of the second control signal, and the down-bridge switch and the up-bridge switch having a switching frequency;
    a first energy-storing capacitor, a first end thereof connected to the first end of the down-bridge switch;
    a clamping capacitor, a first end thereof connected to the second end of the up-bridge switch, and a second end thereof connected to a second end of the first energy-storing capacitor;
    a resonant inductor, a first end thereof connected to a second end of the down-bridge switch;
    a magnetizing inductor, a first end thereof connected to the resonant inductor, and a second end thereof connected to the second end of the clamping capacitor, wherein the current flowing through the magnetizing inductor is a magnetizing inductor current;
    a transformer, having a primary winding and a secondary winding, and the primary winding connected with the magnetizing inductor in parallel, wherein the primary winding and the secondary winding have a mutual inductance effect;
    an output diode, an anode thereof connected to a first end of the secondary winding; and
    an output capacitor, a first end thereof connected to a cathode of the output diode, and a second end thereof connected to a second end of the secondary winding,
    wherein a resonant frequency generated by the resonant inductor and the clamping capacitor in the flyback active clamping power converter is substantially equal to the switching frequency, such that the output diode is able to perform a zero current switching.

2. The flyback active clamping power converter according to claim 1, wherein when the resonant frequency generated by the resonant inductor and the clamping capacitor is equal to the switching frequency, a current value of a primary current flowing through the primary winding is gradually reduced to zero, such that a current value of a secondary current flowing through the secondary winding is zero, such that the output diode is able to perform the zero current switching.

3. The flyback active clamping power converter according to claim 1, wherein when the current value of the magnetizing inductor current is substantially equal to the current value of a resonant current, the current value of the primary current is substantially equal to a zero current value, wherein the resonant current is a current flowing through the resonant inductor.

4. The flyback active clamping power converter according to claim 1, wherein when the down-bridge switch is turned on, the input inductor current charges the input inductor.

5. The flyback active clamping power converter according to claim 1, wherein when the up-bridge switch is turned off and the current value of the input inductor current is zero, the magnetizing inductor current charges a parasitic capacitor of the down-bridge switch.

6. The flyback active clamping power converter according to claim 1, wherein when the voltage across the first and second end of the down-bridge switch is zero, the magnetizing inductor current flows through a body diode of the down-bridge switch, such that the voltage of first energy-storing capacitor increases linearly with the increase of the magnetizing inductor current.

7. The flyback active clamping power converter according to claim 1, wherein when the down-bridge switch is turned off, the input inductor current and the magnetizing inductor current charge a parasitic capacitor of the down-bridge switch.

8. The flyback active clamping power converter according to claim 1, wherein when a body diode of the up-bridge switch is turned on, a conduction current charges the clamping capacitor, wherein the conduction current is the sum of the input inductor current and the magnetizing inductor current.

* * * * *